US007052349B1

(12) United States Patent
Chen et al.

(10) Patent No.: US 7,052,349 B1
(45) Date of Patent: May 30, 2006

(54) METHOD OF RECYCLING A PLASMA DISPLAY PANEL AND THE PRODUCT THEREOF

(75) Inventors: Shu-Ming Chen, Padeh (TW); Tain-E Chen, Padeh (TW); Wen-Shiow Chiang, Padeh (TW)

(73) Assignee: Chunghwa Picture Tubes., Ltd., Taoyuan (TW)

( * ) Notice: Subject to any disclaimer, the term of this patent is extended or adjusted under 35 U.S.C. 154(b) by 25 days.

(21) Appl. No.: 11/011,437

(22) Filed: Dec. 15, 2004

(51) Int. Cl.
*H01J 9/50* (2006.01)

(52) U.S. Cl. ............................................ 445/2; 445/61

(58) Field of Classification Search ..................... 445/2
See application file for complete search history.

*Primary Examiner*—Ashok Patel
*Assistant Examiner*—Anthony Canning
(74) *Attorney, Agent, or Firm*—Birch, Stewart, Kolasch & Birch, LLP

(57) ABSTRACT

A method of recycling a plasma display panel has the steps of checking a panel whether is able to be recycled, removing an original glass ring and an original extracting pipe of the panel, wherein the glass ring is made of a crystalline glass, and mounting a new glass ring and a new extracting pipe, both of which have diameters greater than that of the original glass ring and the original extracting pipe respectively, on the panel at where the original glass ring was. And then, the panel is performed by the deflection, inflection and tip-off steps to finish the backend process of the plasma display panel.

7 Claims, 4 Drawing Sheets

START

Removing the extracting pipe on the panel — 200

Sealing the extracting opening of the panel — 210

Removing the glass ring from the panel — 220

Opening the extracting opening of the panel — 230

END

METHOD OF RECYCLING A PLASMA DISPLAY PANEL AND THE PRODUCT THEREOF

BACKGROUND OF THE INVENTION

1. Field of the Invention

The present invention generally relates to a plasma display panel, and more particularly to a method of recycling the plasma display panel and the product thereof.

2. Description of the Related Art

A conventional backend process of a plasma display panel (PDP) comprises a deflation process, an inflation process, and a seal-off process. Generally, an extracting pipe (or exhausting pipe) is disposed on the panel to perform the deflation process. After being the vacuum inside the panel, a discharged gas (normally an inert gas) is almost filled in the panel, and then the seal-off process is performed which makes the extracting pipe melt and narrow, further separate and close to seal an air-extracting opening of the panel.

The conventional extracting pipe is made of glass and fixed to the air-extracting opening of the panel by a glass ring. If the pipe had an incorrect size or it was broken or it was not airtight where the pipe connected to the air-extracting opening, the backend process would be failed, which means the panel would have a leakage. In addition, the conventional pipes are made of crystalline glass or non-crystalline glass. If the glass ring is made of non-crystalline glass and it is incompletely sealed to occur the leakage, the glass ring could be scrubbed in order to mount a new glass ring and extracting pipe of same size and material on the panel, and then the deflation process is performed again to make the panel not leakage. However, due to the safety consideration of high-temperature environment in the processes, the glass rings are made of crystalline in the present industry. After the crystalline glass ring is scrubbed, the surface is not smooth as it looks like because it has many fine vias inside that makes the surface rough. If aforesaid processes are applied to such panel, the panel will have a leakage after a long time use and cause the panel having shadow at corners while the panel is turned on, even through the glass ring looks like to be bonded to the panel well.

There is no suitable solution to fix the problem as described above. If a plasma display is found with a leakage at the extracting pipe or the glass ring, the display is abandoned right away. It is an uneconomical way and it is very pity.

SUMMARY OF THE INVENTION

One objective of the present invention is to provide a method of recycling a plasma display panel, which can recycle the panel with seal-off or deflation failure because of the problems of the glass ring or the extracting pipe to overcome the drawback as described above.

According to the objective of the present invention, a method of recycling a plasma display panel of the invention is provided, which comprises the steps of:

Checking step: checking a panel whether it is able to be recycled;

Removing step: removing an original glass ring and an original extracting pipe of the panel, wherein the glass ring is made of a crystalline glass;

Reconstructing step: mounting a new glass ring and a new extracting pipe, both of which have diameters greater than that of the original glass ring and the original extracting pipe respectively, on the panel at a location of the original glass ring was; and Getting a recycled panel to perform a deflation process and a seal-off process. The characters of the recycled panel comprise that the diameter of a new glass ring is greater than that of the original one and the residual mark of removed original ring leaves on the panel within the new glass ring.

DETAILED DESCRIPTION OF THE INVENTION

Figure 1:
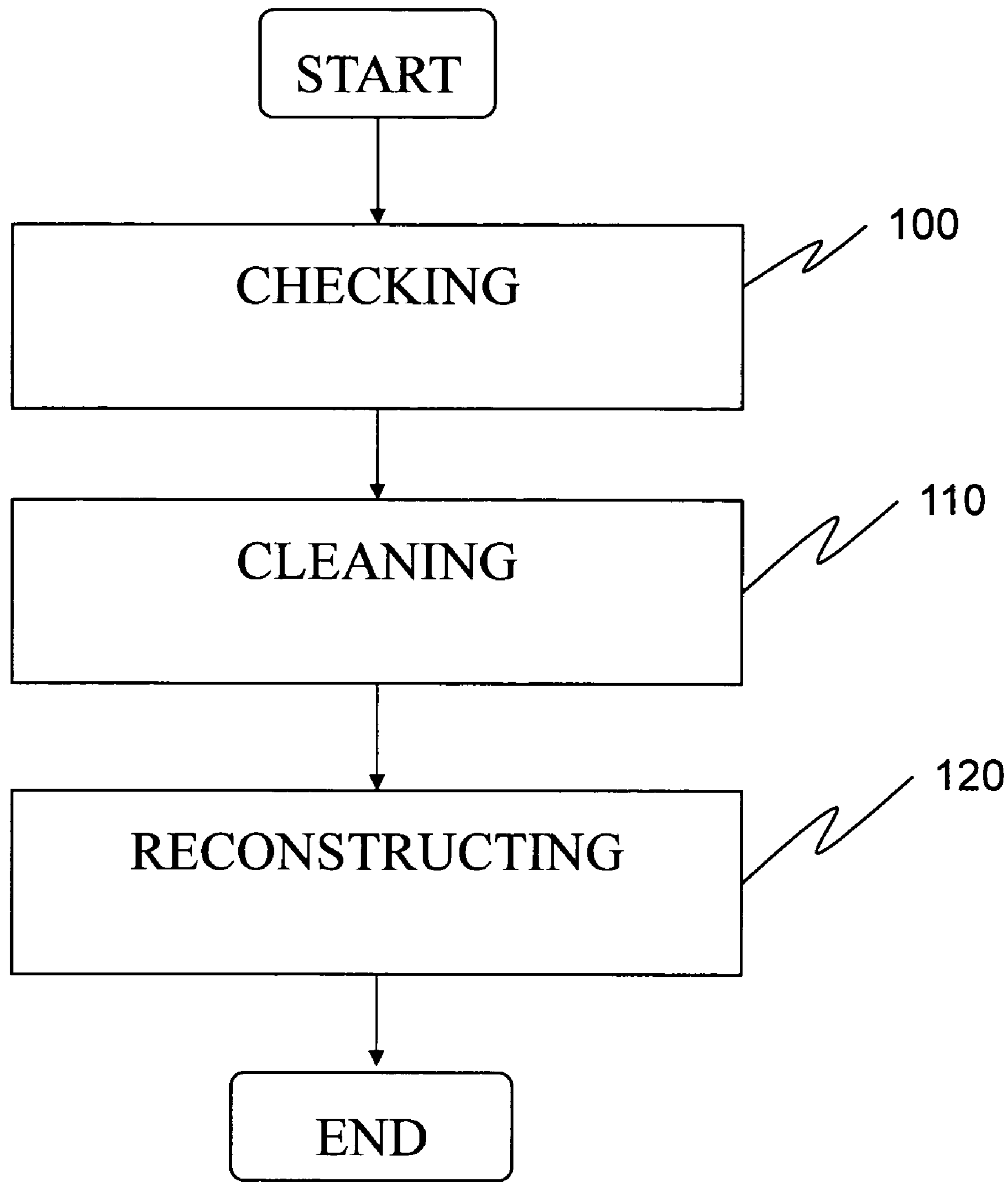
FIG. 1 is a flow chart of a preferred embodiment of the present invention.
Figure 2:
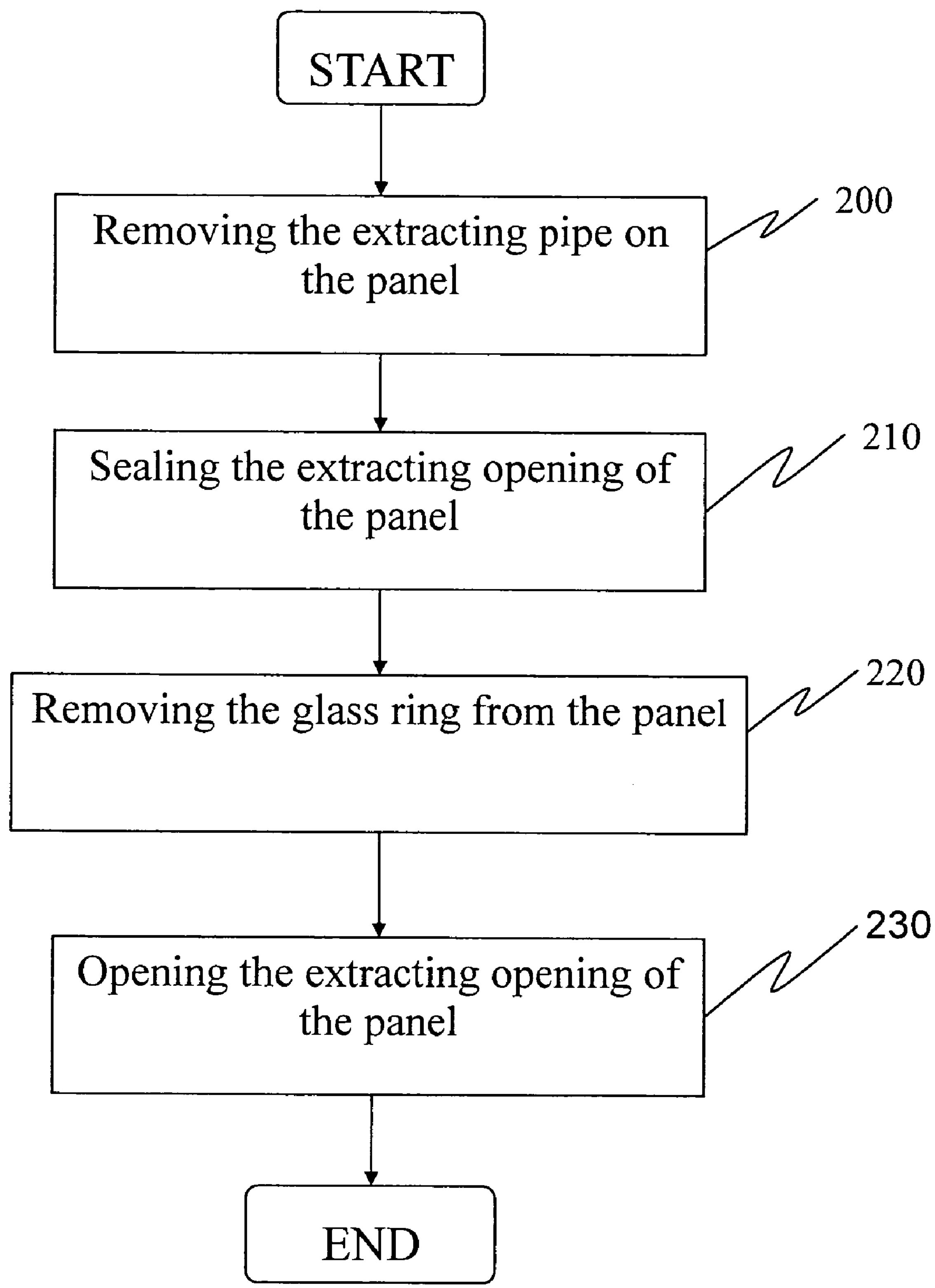
FIG. 2 is a flow chart of the cleaning process of the preferred embodiment of the present invention.

As shown in FIG. 1 and FIG. 2, the preferred embodiment of the present invention provides a method for recycling a plasma display panel, which focuses on the panel having a failure in the inflation, deflation, or seal-off processes because of the defect of the extracting pipe or the glass ring to prevent waste and reduce the cost. The method of the present invention comprises the steps thereof:

First, a checking process (step 100) is performed, which is to find a panel able to be recycled. Such panels comprises the panel which failed during the processes of inflation, deflation, or seal-off, due to extracting pipe broken or the extracting pipe too short to be connected to the panel, or because of a poor sealing problem between the glass ring and the extracting pipe. The pipe is made of glass and the glass ring is made of crystalline glass.

The second step is to perform a cleaning process (step 110), which is to remove the glass ring and the extracting pipe from the panel. The process is shown in FIG. 2. The cleaning process comprises the steps thereof:

Removing the extracting pipe of the panel (step 200): the panel put on a worktable to break the extracting pipe and clean broken pieces thereof. It has to check the extracting opening 18 whether the broken pieces of the extracting pipe are dropped in the panel. If so, suck them out by a vacuum (not shown).

Sealing the extracting opening 18 of the panel (step 210): attaching a tape on the panel to seal the extracting opening.

Removing the glass ring from the panel (step 220): applying a file or an electric mill to mill the panel for remove of the glass ring. This step should be careful to prevent the panel from being damaged. The residues of the glass ring after milling should also be cleaned.

Opening the extracting opening 18 of the panel (step 230): tearing the tape to expose the extracting opening 18 of the panel.

Figure 3:
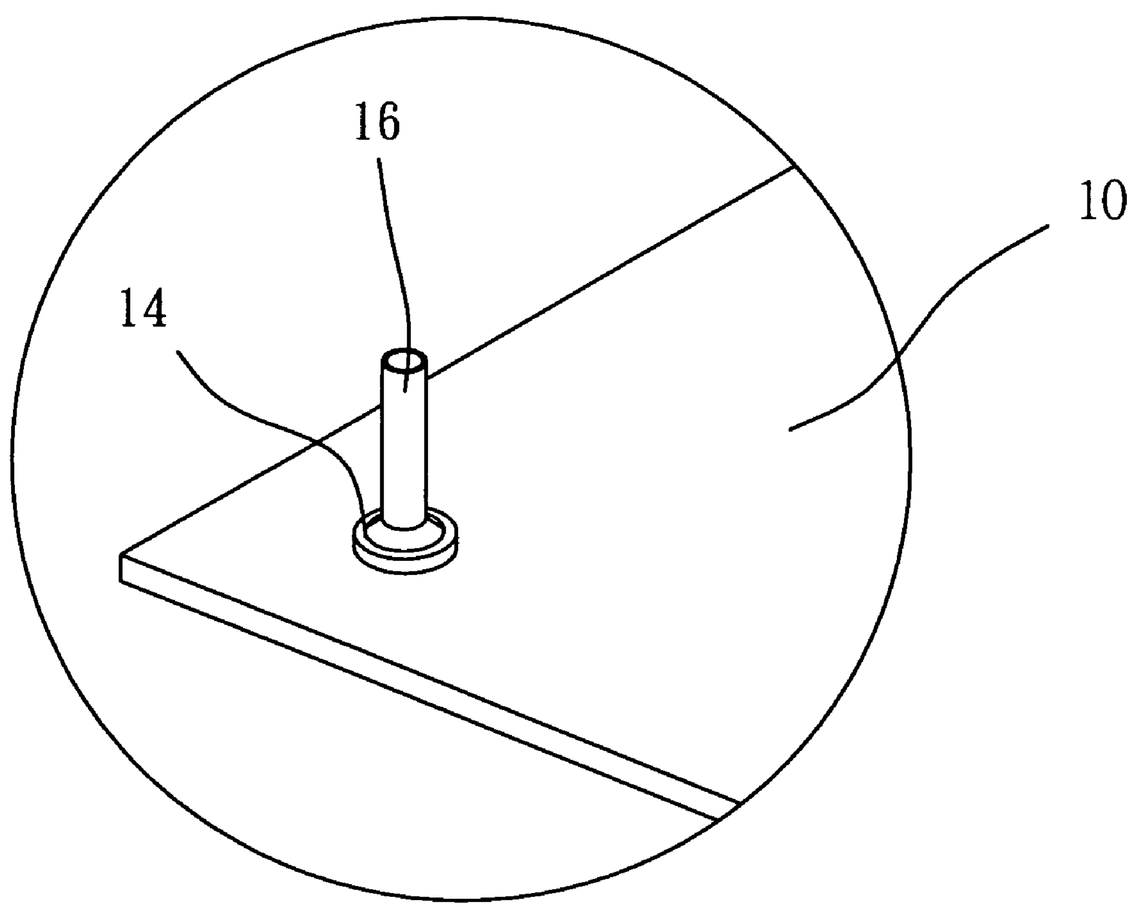
FIG. 3 is a perspective view of the preferred embodiment of the present invention, showing the new glass ring and the new pipe mounted on the panel.
Figure 4:
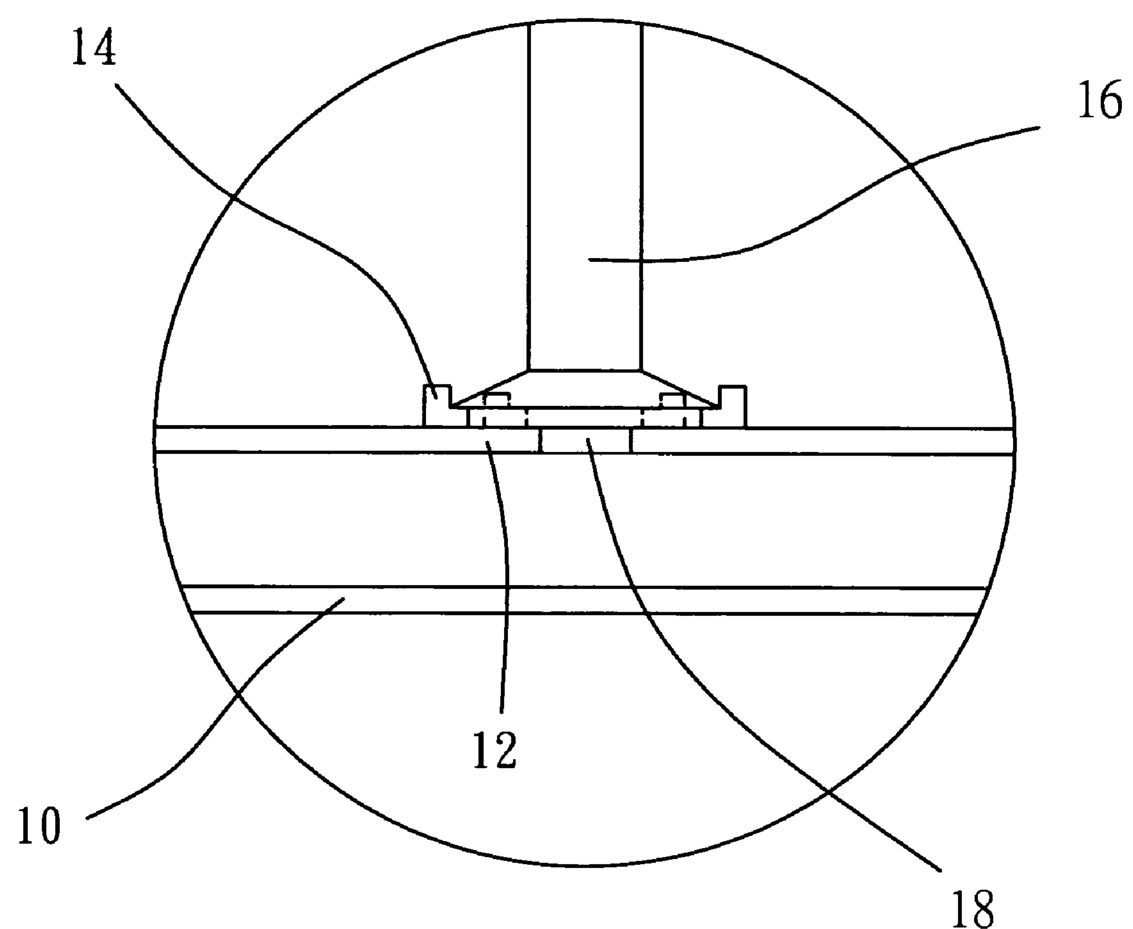
FIG. 4 is a perspective view of the preferred embodiment of the present invention, showing the relationship of the glass ring and the extracting pipe.

The third step of the present invention is to reconstruct the panel 10 (step 120). The reconstructing step further comprises: preparing a new glass ring 14 with a diameter greater than that of the original glass ring 12 and a new extracting pipe 16 to be fitted to the new glass ring 14, and then mounting the glass ring 14 and the extracting pipe 16 on the panel 10 at the location of the original glass ring 12. Because the diameter of the new glass ring is greater than that of the original glass ring 12, this can prevent the new glass ring 14 from overlapping the residual of the original glass ring 12, as shown in FIG. 3 and FIG. 4.

After aforesaid steps, a new panel is born and prepared to perform the processes of deflection, inflection, and tip-off. The characters of the recycled panel comprise that the diameter of a new glass ring is greater than that of the original one and the residual mark of removed original ring leaves on the panel within the new glass ring.

The present invention provides a greater diameter glass ring and an extracting pipe to be mounted on a panel which failed due to a broken pipe, an extracting pipe too short to be connected to the panel, or because of a poor sealing problem between the glass ring and the panel in order to recycle the panel. The recycling method of the present invention gives a help to the accumulation of the wastes of the panels and it also reduces the waste of materials and the cost of fabrication.

In conclusion, the present invention provides a method of providing a greater diameter of glass ring and an extracting pipe to recycle the plasma display panel which failed during the processes of inflation, deflation, or seal-off, due to extracting pipe broken or the extracting pipe too short to be connected to the panel, or because of a poor sealing problem between the glass ring and the extracting pipe. The present invention makes aforesaid plasma display panels, which can not be fixed before, can be fixed and reused.

The present invention has been described via detailed illustration of some embodiments. Those skilled in the art can derive variations from the embodiments without departing from the scope of the present invention. Therefore, the embodiments shall not limit the scope of the present invention defined in the claims.

What is claimed is:

1. A method of recycling a plasma display panel, comprising the steps of:

checking a panel whether said panel is able to be recycled;

removing an original glass ring and an original extracting pipe of said panel, wherein said glass ring is made of a crystalline glass;

mounting a new glass ring and a new pipe, both of which have diameters greater than that of said original glass ring and said original extracting pipe respectively, on said panel at a location of said original glass ring; and getting a recycled panel to perform a deflation process and a seal-off process.

2. The method of recycling a plasma display panel of claim 1, wherein said panel that is able to be recycled failed due to a broken extracting pipe or an extracting pipe too short to be connected to said panel.

3. The method of recycling a plasma display panel of claim 1, wherein said panel that is able to be recycled failed because of a poor sealing problem between said glass ring and said panel.

4. The method of recycling a plasma display panel of claim 1, wherein said removing comprises the sub-steps of:

removing said original pipe from said panel;

sealing an extracting opening of said panel;

removing said original glass ring from said panel; and opening said extracting opening of said panel.

5. The method of recycling a plasma display panel of claim 4, further comprising the sub-step of checking said panel for whether broken pieces of said pipe are dropped in said panel and if so, removing said broken pieces before said step of sealing an extracting opening of said panel.

6. The method of recycling a plasma display panel of claim 4, wherein further comprises said glass ring on said panel is removed by scrubbing.

7. A plasma display panel, processed by the method defined in claim 1, has a new-glass ring with a diameter greater than that of an original glass ring, which had been removed and a residual thereof left on said panel within said new glass ring.

* * * * *